United States Patent
Peña Campos et al.

(10) Patent No.: US 11,121,760 B2
(45) Date of Patent: Sep. 14, 2021

(54) MULTIPLE-INPUT MULTIPLE OUTPUT COMMUNICATION SYSTEM WITH VIRTUAL TRAJECTORY RECEPTION FOR DOUBLY SELECTIVE CHANNELS

(71) Applicant: Centro de Investigación y de Estudios Avanzados .., Mexico City (MX)

(72) Inventors: Fernando Peña Campos, Zapopan (MX); Ramón Parra Michel, Zapopan (MX); Valeri Kontorovich Mazover, Zapapon (MX)

(73) Assignee: CENTRO DE INVESTIGACION Y DE ESTUDIOS AVANZADOS DEL INSTITUTO POLITECNICO NACIONAL, Mexico City (MX)

( * ) Notice: Subject to any disclaimer, the term of this patent is extended or adjusted under 35 U.S.C. 154(b) by 0 days.

(21) Appl. No.: 16/603,172

(22) PCT Filed: Apr. 6, 2017

(86) PCT No.: PCT/MX2017/000045
§ 371 (c)(1),
(2) Date: Oct. 4, 2019

(87) PCT Pub. No.: WO2018/186728
PCT Pub. Date: Oct. 11, 2018

(65) Prior Publication Data
US 2020/0036428 A1    Jan. 30, 2020

Related U.S. Application Data

(63) Continuation of application No. PCT/MX2017/000045, filed on Apr. 6, 2017.

(30) Foreign Application Priority Data

Apr. 5, 2017 (MX) ................... MX/a/2017/004460

(51) Int. Cl.
*H04B 7/08* (2006.01)
*G01S 13/50* (2006.01)
(Continued)

(52) U.S. Cl.
CPC ............ *H04B 7/086* (2013.01); *G01S 13/505* (2013.01); *H04B 7/088* (2013.01); *H04B 7/0857* (2013.01);
(Continued)

(58) Field of Classification Search
CPC ...... H04B 7/086; H04B 7/0857; H04B 7/088; H04B 7/0413; H04B 7/068; G01S 13/505;
(Continued)

(56) References Cited

U.S. PATENT DOCUMENTS

2006/0121946 A1* 6/2006 Walton .................. H04B 7/066
455/561

* cited by examiner

*Primary Examiner* — Kabir A Timory
(74) *Attorney, Agent, or Firm* — IP Law Leaders PLLC

(57) ABSTRACT

The invention described herein presents a system and method to overcome the distortions and affectations introduced by the highly variant channels of one or several antennas both in the transmitter and in the receiver.
Unlike any existing invention that operates under the same conditions, this device uses a completely new reception technique based on the concept of virtual trajectories in which iterative calculations or solution of linear systems in operating time are not required, thus saving a considerable amount of operations.
The receiver of this device manages to convert the fast variations of the channel into virtual antennas, thus achieving a considerable increase in the signal to noise-interference ratio. The resulting performance in terms of noise
(Continued)

immunity is much better than any technique found so far and also requires a much smaller amount of calculations in the receiver.

3 Claims, 5 Drawing Sheets

(51) Int. Cl.
  *H04W 72/04* (2009.01)
  *H04B 7/0413* (2017.01)
  *H04L 5/00* (2006.01)
(52) U.S. Cl.
  CPC ....... *H04W 72/0453* (2013.01); *H04B 7/0413* (2013.01); *H04L 5/001* (2013.01)
(58) Field of Classification Search
  CPC .. H04W 72/0453; H04W 24/02; H04L 5/001; H04L 25/03
  See application file for complete search history.

MULTIPLE-INPUT MULTIPLE OUTPUT COMMUNICATION SYSTEM WITH VIRTUAL TRAJECTORY RECEPTION FOR DOUBLY SELECTIVE CHANNELS

CROSS REFERENCE TO RELATED APPLICATIONS

This application is a national stage application, filed under 35 U.S.C. § 371, of International Patent Application No. PCT/MX2017/000045 filed on Apr. 6, 2017, entitled "Multiple-input multiple output communication system with virtual trajectory reception for doubly selective channels" which is incorporated by reference herein in its entirety. Applicants also claim priority to Mexican Application No. MX/a/2017/004460 filed on Apr. 5, 2017.

FIELD OF THE INVENTION

The present invention refers to telecommunications area, particularly to the implementation of a multiple-input multiple-output antennas (MIMO) communication system that allows for wideband links in very high mobility scenarios.

DESCRIPTION OF THE RELATED ART

The telecommunications revolution of the late twentieth and early twenty-first century has led not only to a is boom in the cell phone industry but to the creation of a major wireless communications industry. Wireless communications, whether through the use of a mobile phone or an almost ubiquitous Wi-Fi connection, are now present in almost all activities of modern life. The demand for faster connectivity (for example, to deliver interactive multimedia content, files, etc.) has put the technological need to support higher data transmission speeds as a key consideration in wireless communications; Consequently, each generation of wireless communication technologies has introduced new signal processing techniques to support higher data rates without compromising communication reliability. Currently, most modern personal assistance devices such as the PDA (Personal Digital Assistant), smartphones, electronic tablets, personal computers, etc., make use of the wireless broadband links that connect them to different types of networks with link coverage from a few meters to a few kilometers. New communication standards designed to allow the transmission of high-definition multimedia content without compression have been developed as well as wireless storing devices.

These links require increasingly high data rates.

The aforementioned requirements entail technical problems, at increasingly higher data rates, the relative delays between the multiple propagation paths of radio signals become non negligible when compared to the duration of the symbol since, in a basic wireless transmitter, a Modulator transforms the data to be transmitted in a sequence of symbols of complex values as dictated by a particular modulation scheme. Therefore, the delayed replicas of each symbol interfere with the reception of subsequent symbols, phenomenon known as inter symbol interference (ISI). This transmission impediment is known as frequency selective attenuation, because the signal has a wider signal bandwidth than the channel coherence bandwidth, that is, the frequency range over which the channel has a relatively flat response.

Currently there is no evidence on the existence in the market or reports in the literature of any technique that allows efficient communication when there is high channel variability due to the high mobility of the devices or because it is operating in very high bands of the electromagnetic spectrum. These channels have both ISI and inter carrier interference (ICI), which reduces the performance of current communications systems. Known applications have a common problem for designing communication systems: the link has significant multipath phenomenon, which adds to the rapid variability of the communication channel.

The technical problem to solve consists in overcoming the distortions and affectations introduced by the highly variant channels of one or several antennas in both, the transmitter and in the receiver side; which resides in the need for high-speed data transmission over doubly selective channels (DSC) and while maintaining reasonable spectral efficiency.

The aforementioned channels lead both single-carrier (SC) and multi-carrier (OFDM: Orthogonal Frequency Division Multiplexing) systems to operate in high interference environments. The ISI in SC and the (ICI) in OFDM are equivalent problems, so the current techniques to combat DSC are similar.

On the other hand, the composition and design of communications systems is tied to two important considerations:
1. Processing time: The high proportion of data to be handled requires algorithms to operate as fast as possible in order to maintain the system performance.
2. Power consumption: Since mobile systems are battery dependent, it is desirable to provide a long battery life (intervals between battery charges). In this sense, the DSP (Digital Signal Processors) algorithms must require a low amount of mathematical operations.

In wireless communications, doubly selective channels are subject to multidirectional fading that varies over time, which leads to both inter-carrier interference ICI and ISI when using Multi-carrier transmission schemes. This is a problem in a broadband network with mobile transceivers, for example, in vehicular communications networks and cellular millimeter-wave networks where the speeds of the communicating entities can be large, causing rapid variation in the wireless channel. Adaptive equalizers and pilot symbols are normally used to compensate for these attenuation effects. However, pilot symbols reduce spectrum efficiency and data rate due to finite radiofrequency resources. In addition, pilot symbols are only effective for slow fade channels. Channel estimation employed to obtain channel state information (CSI) is considerably more difficult in doubly selective fading channels due to the presence of both ISI and ICI.

Another important technique in wireless communications is spatial, temporal and frequency diversity block-coding that exploit the reduced probability of the channel to fade deeply into all branches of diversity simultaneously. It has been proven that MIMO techniques (multiple multiple output inputs), which use multiple transmit and receive antennas for spatial diversity or multiplexing, can significantly improve communications reliability or channel capacity. For advanced radio communications, most transceivers are often equipped with multiple antennas to achieve MIMO gain. Adaptive equalization and pilot symbols are typically used to compensate ISI and ICI. For example, pilot symbols are inserted in packets transmitted to a receiver in order to estimate the CSI of wireless links. The estimated CSI is used to match ISI and ICI. However, pilot symbols inherently reduce spectral efficiency and data transmission speed, since radio frequency resources that are suitable for mobile communications are restricted. In addition, pilot symbols are only effective for slow fade channels. Channel estimation to obtain instantaneous CSI is considerably difficult in doubly selective fading channels due to the presence of both ISI and ICI, even with dense arrays of pilot symbols.

Based on the prior art analysis, there are inventions that try to solve similar problems. A base expansion model (BEM) has been used to approximate selective attenuation channels individually, that is, channels that vary over time or multiple paths to perform semi-blind transmissions for mobile wireless communications, such as U.S. Pat. No. 7,280,604B2 patent case. The BEM is used in conjunction with an iterative semi-blind equalizer based on an expectation maximization (MS) procedure for joint data detection and CSI estimation. With the help of a forward error correction code (FEC), the BEM can make quasi-incoherent communications with a small number of pilot symbols without performance degradation. However, this method is still based on pilot symbols to obtain an initial CSI estimate and FEC soft decision decoding feedback, which can make a receiver more complicated.

Differential Space-Time Coding (DSTC) has been used to perform incoherent communications and to provide diversity gains against channel fading, as is the case with inventions U.S. Pat. Nos. 7,567,623B2, 7,508,808B2 and 7,397, 866B2. Non-coherent communications do not need to use any pilot symbols, and greater spectral efficiency can be maintained because there is no communications overhead. DSTC coding is performed by the Grassmann orthogonal matrix, as is the case with inventions U.S. Pat. Nos. 6,801, 579B1, 7,864,876B2 and 7,170,954B2. However, DSTC does not work well in fast channels that vary over time, where the channel's coherence time is too short to exploit the orthogonal characteristic of the Grassmann matrix. To solve this problem, the BEM and DSTC can be used simultaneously with the Generalized Likelihood-Ratio Test (GLRT), such is the case of the invention U.S. Pat. No. 8,059,747B1. Non-coherent communications can be made with BEM even for fading channels that vary over time and for high-speed data rate transmissions. This method and system can be extended to doubly selective fading channels by introducing multidimensional BEM, in which two different types of base functions are used over time and in the frequency domain to treat doubly selective fading channels.

On the other hand, BEM itself is susceptible to some hardware imperfections, such as time compensation and carrier compensation. For example, carrier timing and shifts can be caused by hardware impediments, such as the inaccuracy of a clock circuit that includes, for example, a crystal oscillator. Such displacements are not desired for a number of applications and, they can be compensated by a specially designed synchronization process. Such is the case of the invention U.S. Pat. No. 7,961,697B2 which describes a method for synchronizing clocks between the receiver and the transmitter using predefined training sequences in synchronization packets. However, the transmission of the synchronization packets causes an additional communications overhead, which is undesirable or even unacceptable for a number of applications.

In addition to the above-mentioned inventions, inventions U.S. Pat. Nos. 9,088,447B1 and 9,264,118B1 have described an incoherent transmission method based on Grassmann space-to-block coding and BEM.; The detection is carried out by means of an iterative method of Generalized Likelihood Reason Test.

Inventions with application number MX/A/2015/011471 and MX/A/2015/011472 describe the use of virtual paths with coherent and incoherent detection respectively, however, the field of these inventions is limited to solving the problem only in systems with a single antenna in transmission and reception.

The invention US2014/0105315A1 describes a method of transmission in doubly selective MIMO channels using space-frequency block modulation. Other inventions and/or works focus only on the channel estimation process, for example, the invention U.S. Pat. No. 8,451,930B2 describes a method for estimating double-selective MIMO channels using recursive least squares (RLS) and expectation maximization (EM) methods. Finally, some other works found in the literature such as [Pierluigi Salvo Rossi, Ralf R. Muller, and Ove Edfors. Linear mmse estimation of time-frequency variant channels for mimo-ofdm systems. IEEE Trans. Signal Process., 91 (5): 1157-1167, 2011.] and [Peter Hammarberg, Fredrik Rusek, and Ove Edfors. Iterative receivers with channel estimation for multi-user MIMO-OFDM: complexity and performance. EURASIP Journal on Wireless Communications and Networking, 2012 (1): 75, 2012.] focus on iterative channel detection and equalization techniques. These methods repeatedly perform the channel estimation using the data obtained in the previous iteration.

In the invention object of this document, a multi-antenna communications system (MIMO) is described which allows wireless broadband links to be established in environments with high movement speeds. In the particular case of existing methods for MIMO channels:

There are systems based on incoherent detection that present the disadvantage of requiring maximum likelihood data detection. This method requires a large number of iterative calculations that depend largely on the size of the code used, so its implementation on a mobile device is very difficult.

There are methods completely incompatible with current technologies, so their implementation on current devices would be a major inconvenience. Additionally, the form of modulation of these methods requires a large number of guard bands both in time and frequency, considerably reducing the spectral efficiency of the system.

In the case of the rest of the methods focused on iterative channel estimation, one of the disadvantages is the need for periodic execution of channel estimation, matching and decoding algorithms for each received block. This type of approach requires a large amount of calculations to be implemented in a mobile device. In addition, the iterative process does not guarantee an improvement in the estimate given that there is a high dependence on the performance of channel decoders.

The invention described below takes into account the above and presents a method to overcome the distortions and affectations introduced by the highly variant channels of one or several antennas both in the transmitter and in the receiver described in the prior art.

DETAILED DESCRIPTION OF THE INVENTION

The characteristic details of the Multiple Inputs and Multiple Outputs communication system for doubly selective channels with virtual trajectories reception are clearly shown in the following description and in the accompanying illustrative drawings, serving the same reference signs to indicate the same parts In this invention two variants are proposed for the transmission of data in channels of Multiple Inputs and Multiple Outputs doubly selective:
 one that implements pilot transmission and consistent reception and
 the other that uses differential coding and incoherent reception.

Both methods operate on the virtual trajectories receiver that is the main component of this invention.

Figure 2:
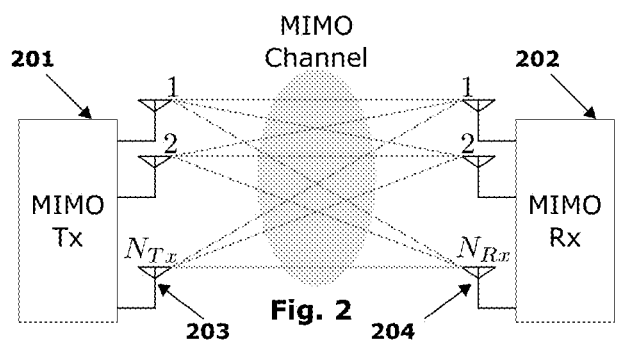
FIG. 2 shows a general diagram of the communication system with MIMO channel.

FIG. 2 shows the transmitter (MIMO Tx) (201) that incorporates the modulation of the data together with the digital and analog processing for the transmission of the signal in each of the $N_{Tx}$ antennas (203). The carrier signal may comprise electromagnetic, acoustic waves, etc. On the receiving side (MIMO Rx) (202) with its $N_{Rx}$ antennas (204), the signal demodulation and digital/analog processing are performed for the detection of the data sent.

On the receiver side, (MIMO Rx) (202) assuming that analog demodulation has been performed and subsequent conversion to complex low-pass representation, the signal received by the i-th antenna is given by the expression:

$$y_\rho[n] = \sum_{v=0}^{N_{Tx}-1} \sum_{l=0}^{L-1} h[v, \rho; n, l] x_v[(n-l)_N] + w_\rho[n] \quad (I)$$

where n={0, ..., N-1}, ρ={0, ...,$M_R$-1}, $x_v[n]$ is the incoming signal from the v-th transmitter antenna, $w_\rho[n]$ is the white Gaussian additive noise in the ρ-th receiver antenna and h[v,ρ;n,l] is the channel impulse response at the n-th time instant for the l-th delay time.

In order to incorporate channel statistics, its expansion modeling is used in orthogonal bases of the form:

$$h[v, \rho; n, l] = \sum_{m=0}^{M-1} \alpha_m \phi_m[v, \rho, n, l] + \varepsilon[v, \rho, n, l] \quad (II)$$

where $$\alpha_m = \sum_{v=0}^{N_{Tx}-1} \sum_{\rho=0}^{N_{Rx}-1} \sum_{n=0}^{N-1} \sum_{l=0}^{L-1} h[v, \rho; n, l] \phi_m^*[v, \rho, n, l] \quad (III)$$

is the channel coefficient for the m-th basis function $\phi_m[v, \rho,n,l]$ and ε[v,ρ,n,l] is the modeling error, which for reasons of practicality in the explanation will be omitted from now on. The best base functions in terms of mean square error are given by the expansion of Karhunen Loève, however in real applications this set of functions is not efficient since it depends very closely on the accuracy of the channel statistics. In addition, a periodic calculation process of these functions would be necessary, which is computationally unfeasible. For this reason, it was decided to use a set of generic bases, which are broken down in the external product of a set of functions that expand each domain of the channel:

$$h[v, \rho; n, l] = \quad (IV)$$
$$\sum_{a=0}^{M_T} \sum_{b=0}^{M_R} \sum_{r=0}^{M_\tau-1} \sum_{q=0}^{M_D-1} \alpha_{a,b,r,q} \phi_a^{IV}[v] \phi_b^{III}[\rho] \phi_r^{II}[l] \phi_q^{I}[n] + \varepsilon[v, \rho, n, l]$$

where $\phi_a^{IV}[v]$, $\phi_b^{III}[\rho]$, $\phi_r^{II}[l]$, $\phi_q^{I}[n]$ and $\alpha_{a,b,r,q}$ are the functions that expand the domain of the receiving antennas, the transmitting antennas, the delay time and the time respectively, each with the coefficient $\alpha_{a,b,r,q}$. By replacing this model in the equation of the received signal the following observation model equation is obtained:

$$y_\rho[n] = \quad (V)$$
$$\sum_{a,b,r,q \in S} \sum_{v=0}^{N_{Tx}} \sum_{l=0}^{L-1} \alpha_{a,b,r,q} \phi_a^{IV}[v] \phi_b^{III}[\rho] \phi_r^{II}[l] \phi_q^{I}[n] x[v, \langle n-l \rangle_N] + w_\rho[n]$$

where S is the variable space for a, b, r y q
Transmitter.

The waveforms of the transmitter consist of sets of space-time signals that determine the output on each antenna for each instant of time. Since the channel model has both domains separated, the selected waveforms are also separable, this solution also simplifies the incorporation of the models for an antenna in [Pierluigi Salvo Rossi, Ralf R. Muller, and Ove Edfors. Linear mmse estimation of time-frequency variant channels for mimo-ofdm systems. IEEE Trans. Signal Process, 91 (5): 1157-1167, 2011].

In order to reduce the complexity in the transmitter taking advantage of the correlation existing in the antennas, transmission functions are defined as:

$$x[v, n] = \sum_{a=0}^{M_T} \sum_{i=0}^{N_I-1} \beta_{a,i} s_i[n] \phi_a^{IV*}[v] \quad (VI)$$

where the doubly indexed variable $\beta_{a,i}$ is the symbol transmitted by the a-th transmitter virtual antenna in the i-th time function. This particular selection of spatial modulation concentrates the transmission energy in the transmission modes. By incorporating this model of the transmitted signal in the equation (V) of the receiver observation the following expression is obtained:

$$y_\rho[n] = \sum_{a,b,r,q \in S} \sum_{l=0}^{L-1} \sum_{i=0}^{N_I-1} \alpha_{a,b,r,q} \phi_b^{III}[\rho] \phi_r^{II}[l] \phi_q^I[n] \beta_{a,i} s_i[\langle n-l \rangle_N] + w_\rho[n]. \quad \text{(VII)}$$

In the particular case when $\phi_a^{IV}[v]$ are the eigenfunctions of the channel's kernel, this technique becomes a transmission of eigenmodes. By applying this same approximation to the receiver, the equation becomes:

$$Y_b[n] = \sum_{\rho=0}^{N_{Rx}-1} y_\rho[n] \phi_b^{III*}[\rho] = \quad \text{(VIII)}$$

$$\sum_{a,r,q \in S} \sum_{l=0}^{L-1} \sum_{i=0}^{N_I-1} \alpha_{a,b,r,q} \phi_r^{II}[l] \phi_q^I[n] \beta_{a,i} s_i[\langle n-l \rangle_N] + w_\rho[n]$$

At this point it is possible to introduce the concept of virtualization in the model, by replacing the temporary part of the transmitted functions by the set of complex exponentials:

$$s_i[n] = e^{j2\pi k_i n/N}, \quad \text{(IX)}$$

The observation model is rewritten as:

$$Y_b[n] = \sum_{a=0}^{M_T} \sum_{q=0}^{M_D-1} \sum_{i=0}^{N_I-1} \vartheta_{a,b,q}^i \psi_q^i[n] + w_b[n], \quad \text{(X)}$$

where $$\vartheta_{a,b,q}^i = \beta_{a,i} \sum_{r=0}^{M_T-1} \alpha_{a,b,q,r} \varphi_r^i \quad \text{(XI)}$$

$$\varphi_r^i = \sum_{l=0}^{L-1} \phi_r^{II}[l] e^{-j2\pi k_i l/N}, \quad \text{(XII)}$$

$$\psi_q^i[n] = \phi_q^I[n] s_i[n] \quad \text{(XIII)}$$

Equation (X) represents the observation model in the virtual trajectory domain, which offers the advantage of being composed of fully known functions in advance, leaving the stochastic part only to the coefficients of the channel and the data. The carriers are assigned according to the expression:

$$k_i = i M_D - N/2. \quad \text{(XIV)}$$

Figure 4:
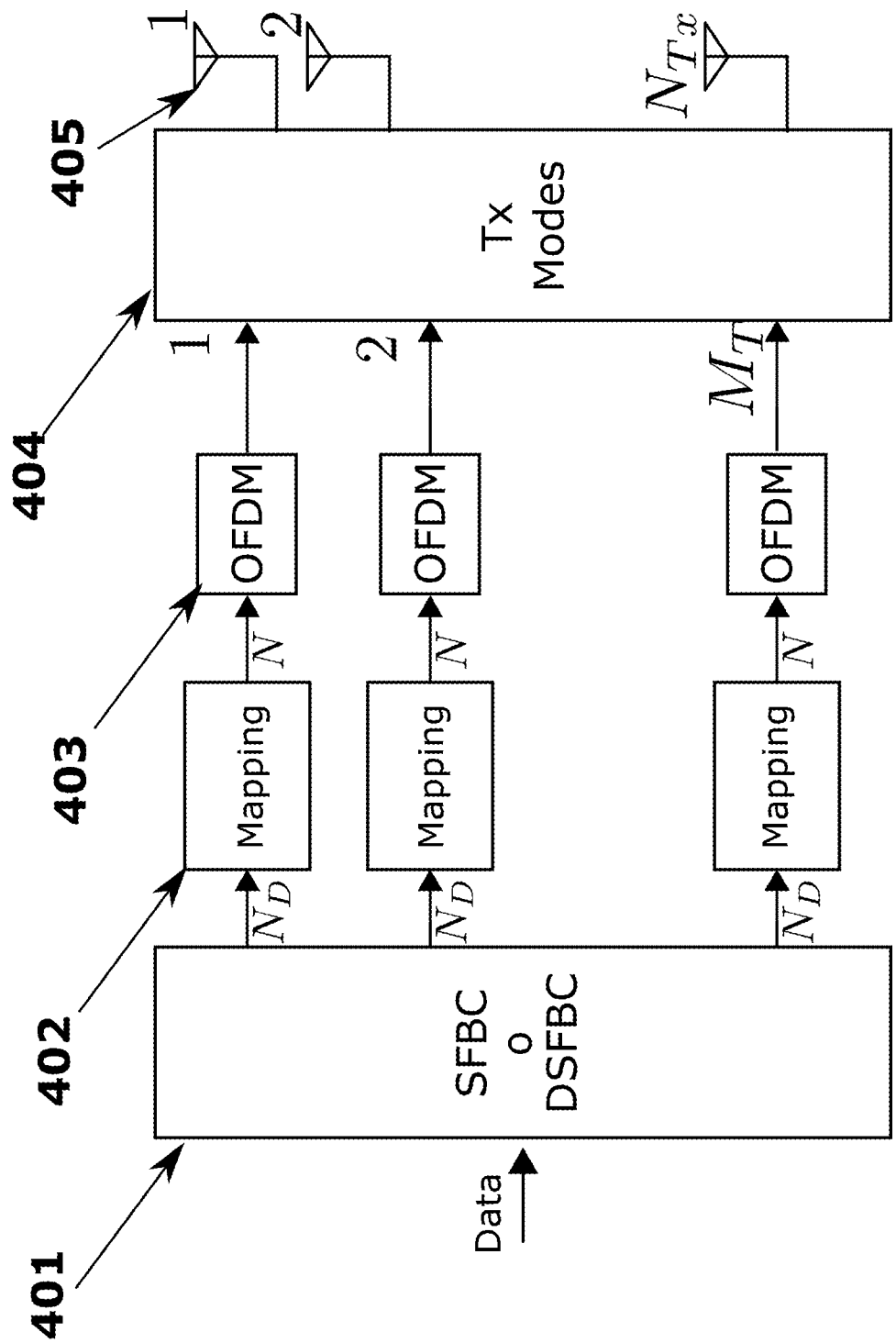
FIG. 4 shows the structure of the transmitter system of the proposed communications system.

The structure of the transmitter is shown in FIG. 4, the data is entered into an SFBC or DSFBC frequency space encoder (401) that can be differential in the case of the inconsistent system. Subsequently, the assignment (402) of the symbols to the carriers of each virtual antenna is carried out. Each branch is modulated in a conventional orthogonal frequency multiplexing (OFDM) scheme (403) to subsequently convert the transmission modes (404) to antennas (405).

Estimation of Virtual Trajectories.

As mentioned earlier, this invention covers two variants, in the case where the transmitter uses SFBC coding by attaching pilot subcarriers, the receiver can perform consistent data detection, for the case where DSFBC differential coding is used, the receiver uses incoherent detection. Both approaches can be simplified by first estimating the Doppler virtual paths to obtain diagonal models free of interference. In order to facilitate mathematical expressions, the matrix-vector notation is adopted:

$$Y_b = \sum_{a=0}^{M_T-1} \Psi \Omega_{a,b} \beta_a + w_b \quad \text{(XV)}$$

where $$Y_b = [Y_b[0] Y_b[1] \ldots Y_b[N-1]]^T, \quad \text{(XVI)}$$

$$w_b = [w_b[0] w_b[1] \ldots w_b[N-1]]^T, \quad \text{(XVII)}$$

$$\beta_a = [\beta_{a,0}, \beta_{a,1}, \ldots, \beta_{a,N_I-1}]^T, \quad \text{(XVIII)}$$

and the virtual transfer functions encapsulated in the matrix:

$$\Omega_{a,b} = \begin{bmatrix} D(\Gamma \alpha_{a,b,0}) \\ \vdots \\ D(\Gamma \alpha_{a,b,M_D-1}) \end{bmatrix} \quad \text{(XIX)}$$

with $[\Gamma]_{i,r} = \varphi_r^i$, $\alpha_{a,b,q} = [\alpha_{a,b,q,0}, \ldots, \alpha_{a,b,q,M_\tau-1}]^T$. From this model it is easy to observe that in order to simplify the receiver and obtain a diagonalized temporal structure, virtual Doppler trajectories must first be estimated using the pseudoinverse of the deterministic matrix $\Psi$. So the virtual trajectory coefficients are obtained as:

$$\hat{\vartheta}_b = \Psi^\dagger Y_b = \sum_{a=0}^{M_T-1} \Psi^\dagger \Psi \Omega_{a,b} \beta_a + \Psi^\dagger w_b \quad \text{(XX)}$$

$$\approx \sum_{a=0}^{M_T-1} \Omega_{a,b} \beta_a + \tilde{w}_b \quad \text{(XXI)}$$

Where $\Psi^\dagger = (\Psi^H \Psi)^{-1} \Psi$.

This Diagonalized Expression of the Received Signal Represents the Main Idea of the Receiver of this Invention.

The main advantage lies in the fact that the estimation of the virtual trajectories is carried out using a matrix that is inverted out of execution time, that is, the process is carried out in the design stage and the inverse matrix is simply stored in the receiver. So the receiver only requires the execution of a matrix-vector product to obtain estimates of the virtual coefficients for the interference-free data.

The computational complexity of the virtual trajectory estimator can be significantly reduced if it is operated directly in the frequency domain.

Assume that the received block is transformed using a Unitary Fourier matrix as follows:

$$\Psi^\dagger F^H F Y_b = \Lambda u_b \quad \text{(XXII)}$$

where $$\Lambda = \Psi^\dagger F^H \quad \text{(XXII)}$$

$$u_b = F Y_b \text{ and}$$

$$[F]_{n,n'} = \frac{1}{\sqrt{R}} e^{(-j2\pi n'n/N)}, n, n' = [0, \ldots, N-1] \quad (XXIV)$$

Since the pseudo inverse frequency domain matrix $\Lambda$ has the greatest amount of energy concentrated in the central band, it can be truncated to a matrix $\check{\Lambda}$ containing only a small number of nonzero elements near the main diagonal. This allows a significant reduction not only of calculations but also of the memory needed to store the contents of the virtual path estimation matrix.

Data Estimation.

For the low complexity coherent estimation of the data symbols, a suboptimal detector is proposed. The noise correlation matrix is approximated in virtual trajectories domain as:

$$R_{\tilde{w}_b} = \sigma_{\tilde{w}_b}^2 (\Psi^H \Psi)^{-1} \approx \frac{\sigma_{\tilde{w}_b}^2}{N_I M_D} tr\{(\Psi^H \Psi)^{-1}\} I_{N_I M_D} \approx \sigma_{\tilde{w}_b}^2 I_{N_I M_D}, \quad (XXV)$$

This approximation enables the observation model for each virtual trajectory and for each reception mode to be expressed independently. The observation equation for the b-th reception mode an the q-th Doppler trajectory can be rewritten as:

$$\hat{\vartheta}_{b,q} = \sum_{a=0}^{M_T-1} D(\Gamma\alpha_{a,b,q})\beta_a + \tilde{w}_{b,q} \quad (XXVI)$$

Figure 5:
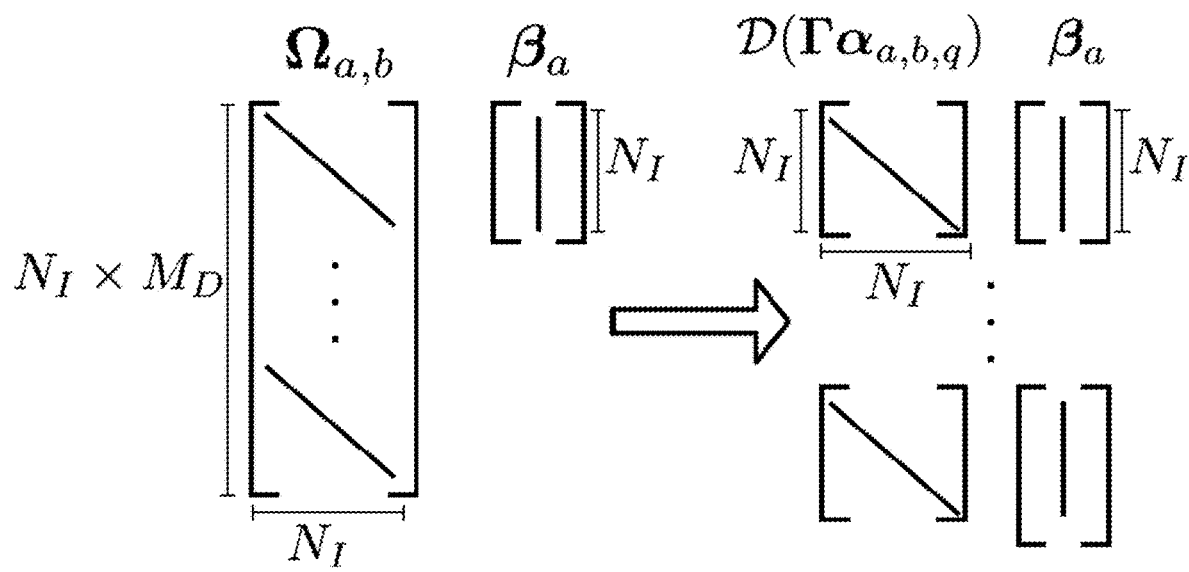
FIG. 5 shows the representation of the equivalence of Doppler paths in virtual receiving antennas. Based on the method proposed in this invention, a diagonalized data observation model can be obtained, which is equivalent to what would be obtained with a conventional MIMO-OFDM system in the presence of non-time-varying channels. So Doppler diversity can now be manipulated as if it were additional receiving antennas, thus obtaining a model of Multiple Inputs and Multiple Outputs equivalent with virtual receiving antennas which can now be treated with conventional techniques of combined.

Note that thanks to the method proposed here, a diagonalized data observation model can be obtained, which is equivalent to what would be obtained with a conventional MIMO-OFDM system in the presence of non-time-varying channels. So Doppler diversity can now be manipulated as if it were additional receiving antennas, thus obtaining an equivalent MIMO model with $M_D \times M_R$ virtual receiving antennas as shown in FIG. 5, which can now be treated with conventional combining techniques.

Assuming that the channel parameters $\Gamma\alpha_{a,b,q}$ have been estimated by the algorithm described in the following section, the data detection data will depend on the particular diversity technique chosen for the space frequency encoder. These codes are not part of the present invention.

Channel Estimation.

In the invention object of this document, the channel estimate can be obtained simply if the observation equation is reorganized as:

$$\hat{\vartheta}_{b,q} = \sum_{a=0}^{M_T-1} D(\beta_a)\Gamma\alpha_{a,b,q} + \tilde{w}_{b,q}, \quad (XXVII)$$

and assuming that from the set of subcarriers $\{\beta_{a,i} | i \in 0, \ldots, N_I-1, a \in 0, \ldots, M_T-1\}$ a subset $\{\beta_{a,i}^P | p \in P\}$ has pilots, i.e., training known by the receiver. Since the observation model is diagonalized, the input to output relation for these pilots can be expressed as:

$$\hat{\vartheta}_{b,q}^P = \sum_{a=0}^{M_T-1} D(\beta_a^P)\Gamma^P\alpha_{a,b,q} + \tilde{w}_{b,q}^P, \quad (XXVIII)$$

where $\hat{v}_{b,q}^P$ is a vector conformed by the elements of $\hat{v}_{b,q}$ in the pilot positions, $\Gamma^P$ is made by the rows of $\Gamma$ in the data positions for the a-th transmission mode and $\beta_a^P$ is th vector with the transmitted pilots. In the generalized case when pilot arrangements between different modes of transmission are not independent, equation (XXVIII) can be rearranged in the form:

$$\hat{v}_{b,q}^P = (1_{M_T} \otimes I_{N_P})D(\beta^P)(I_{M_T} \otimes \Gamma^P)\alpha_{b,q} + \tilde{w}_{b,q}^P = \Phi\alpha_{b,q} + \tilde{w}_{b,q} \quad (XXIX)$$

where $\beta_P = [\beta_0^{PT}, \ldots, \beta_{M_T-1}^{PT}]^T$ and $\alpha_{b,q} = [\alpha_{0,b,q}^T, \ldots, \alpha_{M_T-1,b,q}^T]^T$. Since $\Phi$ is a matrix known beforehand in the receiver, the solution with adequate balance between computational complexity and performance is to calculate offline and save the least squares estimator given by the pseudoinverse $\Phi^\dagger$, leading to the parameters estimator:

$$\hat{\alpha}_{b,q} = \Phi^\dagger \hat{v}_{b,q}^P = (\Phi^H \Phi)^{-1} \Phi^H \hat{v}_{b,q}^P \quad (XXX)$$

Figure 6:
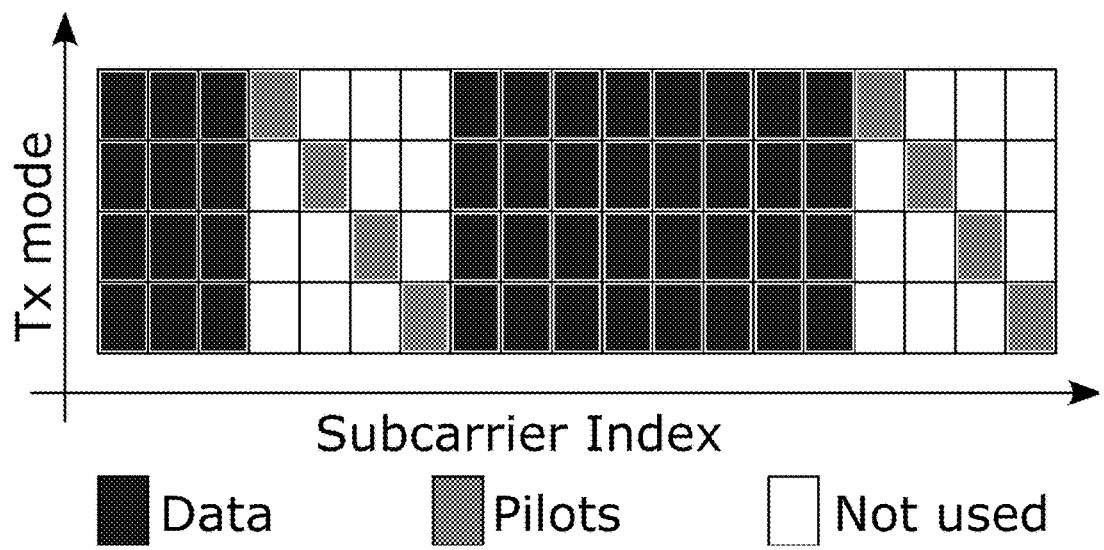
FIG. 6 shows the arrangement of pilots and data in a frame.

If instead, the pilot arrangement is not only orthogonal but also independent between the transmission modes Tx as shown in FIG. 6, the observation model represented by equation (XXVIII) can be simplified to the form:

$$\hat{v}_{b,q}^P = D(\beta_a^P)\Gamma^P\alpha_{a,b,q} + \tilde{w}_{b,q}^P = \Theta\alpha_{a,b,q} + \tilde{w}_{b,q}^P \quad (XXXI)$$

where $\Theta \square D(\beta_a^P)\Gamma^P$. The parameters of the channel BEM can then be calculated separately for each of the transmission modes; by using the least squares criterion, the estimator is expressed as:

$$\hat{\alpha}_{a,b,q} = \Theta^\dagger \hat{v}_{b,q}^P = (\Theta^H \Theta)^{-1} \Theta^H \hat{v}_{b,q}^P \quad (XXXII)$$

It is important to note in equation (XXXI) that again, thanks to the use of virtual trajectory separation, it is possible in this case to estimate highly variant channels as if they were invariant channels, significantly simplifying the receiver and enabling the use of known techniques of channel estimation used in conventional MIM-OFDM systems.

Assuming that the channel parameters $\Gamma\alpha_{a,b,q}$ have been estimated by the algorithm described in this section, the detection of the data will depend on the particular diversity technique chosen for the space frequency encoder. These codes are not part of the present invention.

Differential Coding and Incoherent Data Detection.

Considering the observation model obtained in equation (XXVII) it can be concluded that the input/output ratio in the Multiple input system Multiple outputs described in this invention is equivalent to a MIMO-OFDM system in invariant systems with the additional advantage of incorporating temporal variability in the form of virtual receiving antennas. For this reason, incoherent reception techniques based on differential space-frequency coding (DSFBC) can be transparently incorporated into this system.

Receiver System Operation.

Figure 3:
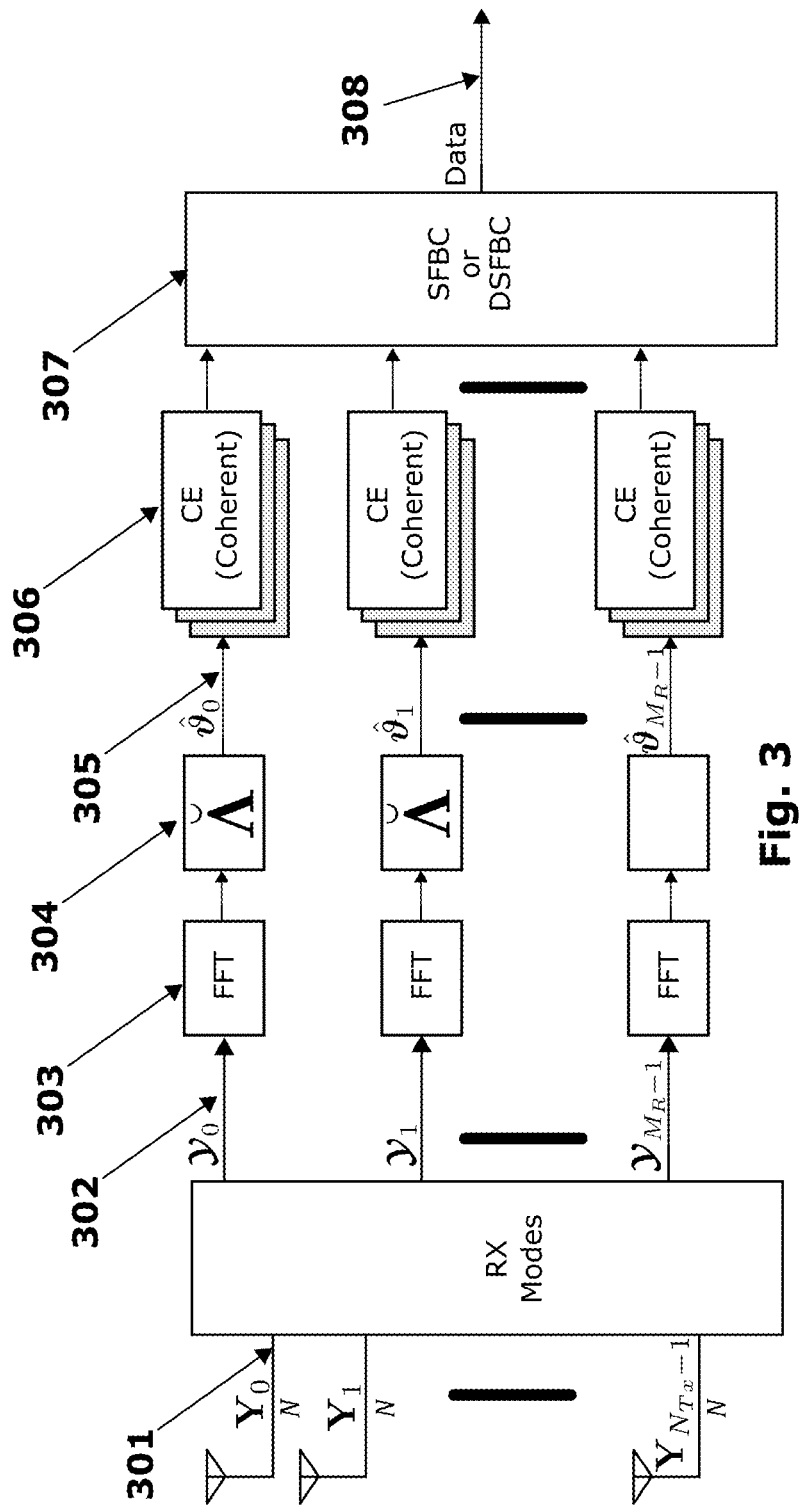
FIG. 3 shows the structure of the receiver of the proposed communications system.

The receiver structure of the proposed communications system is shown in FIG. 3. After the stages of analog/digital coupling to the propagation medium, the received signal (301) on each antenna is projected in the reception modes for the conversion of physical antennas in virtual antennas. Each of the output signals (302) of this module is treated independently by each reception mode in each of the virtual path separators (303) and (304) that operate based on equations (XXII) and (XXIII). In the case of the system with coherent detection, the result of this virtual trajectory estimator (305) is used by the channel estimation algorithm (306) that operates based on equation (XXXII), which in turn passes the virtual trajectory coefficients along with the estimated channel parameters to the SFBC decoder (307). In the case of the variant with inconsistent reception, the virtual path coefficients (305) are transferred directly to the differential decoder DSFBC. Finally, for both cases, coherent or incoherent detection, the temporal space decoder (307) (SFBC for coherent case and DSFBC for incoherent case) delivers the estimated data (308).

Method for Calculating all Necessary Parameters and Matrices in the Transmitter and Receiver System.

Figure 7:
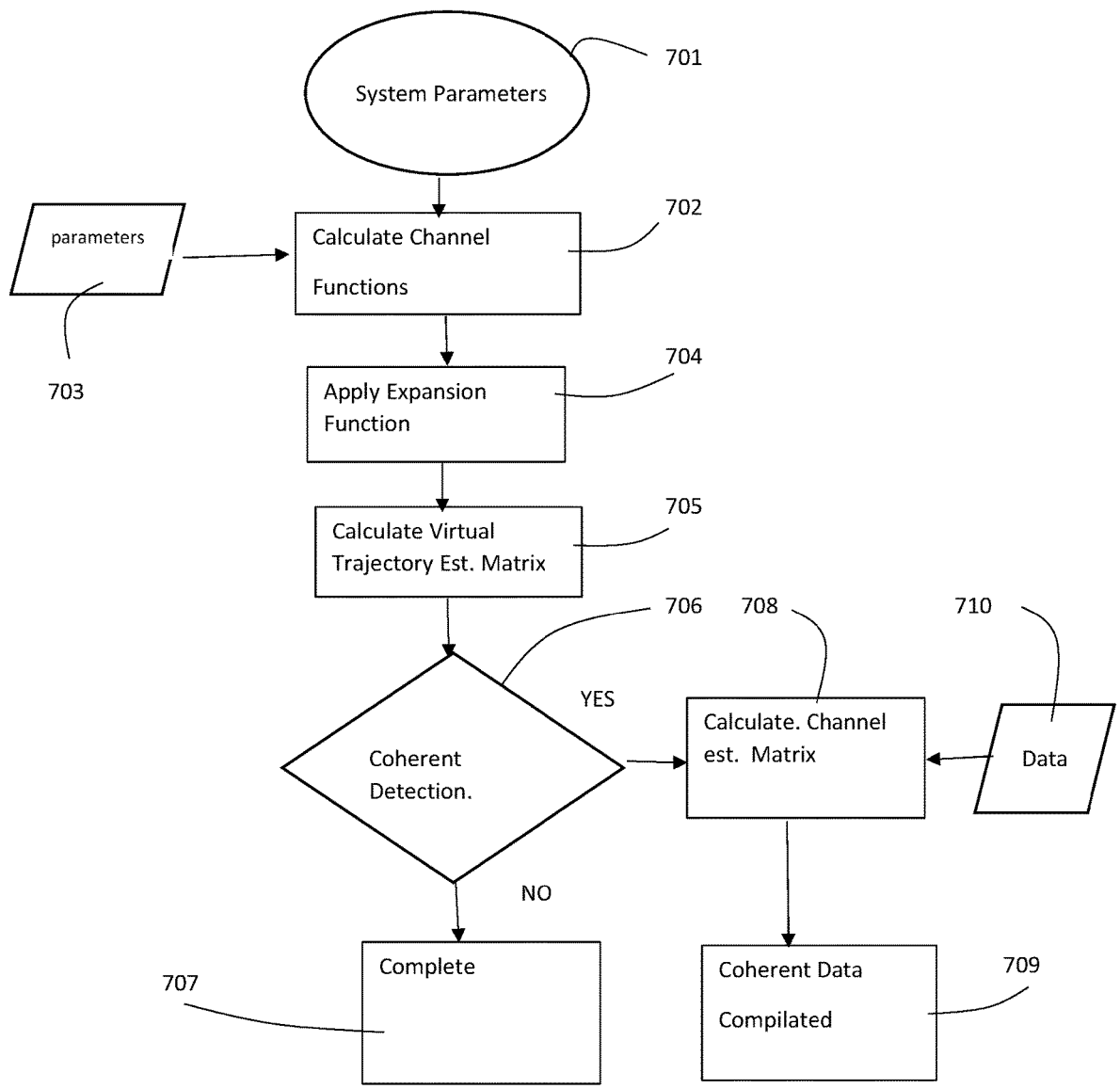
FIG. 7 shows the flow chart of the method for calculating all the necessary parameters and matrices in the transmitter and receiver system.

The method for calculating all the necessary parameters and matrices in the transmitter and receiver system are performed offline at the time of system designing, so the calculations made in this system do not need to be calculated once the system is operating. FIG. 7 shows the flow chart for developing such calculations offline. The process begins with the calculation of the system parameters (701) and then proceeds with the calculation of the channel expansion functions (702) that are necessary in equation (IV). In order to carry out this process, the information of the parameters of maximum dispersion in time and frequency, the correlation of the channel or, in its absence, maximum dispersion of arrival angles, as well as block size and bandwidth of the system (703) are used. Once this process has been carried out, the expansion functions are used to calculate the quantity and distribution of carriers (704) that the transmitter (403 or 201) can use through computation of equation (XIV). The results of the previous processes are used to calculate the virtual trajectory estimation matrix $\mathring{\Lambda}$ (705) in transmission modes (404) using a truncated version of the matrix defined in equation (XXIII). It is verified if the system is with coherent detection (706), if it is not, the calculation of parameters (707) is completed since the calculation of additional system parameters is not required. On the other hand, for the coherent detection, the calculation of the channel estimation matrix is performed $\Theta^\dagger$ (708) using the information on the position of the pilot carriers as well as their respective values in equations (XXX) to (XXXII) (710), ending with this the computation of parameters for the coherent system (709).

Figure 1:
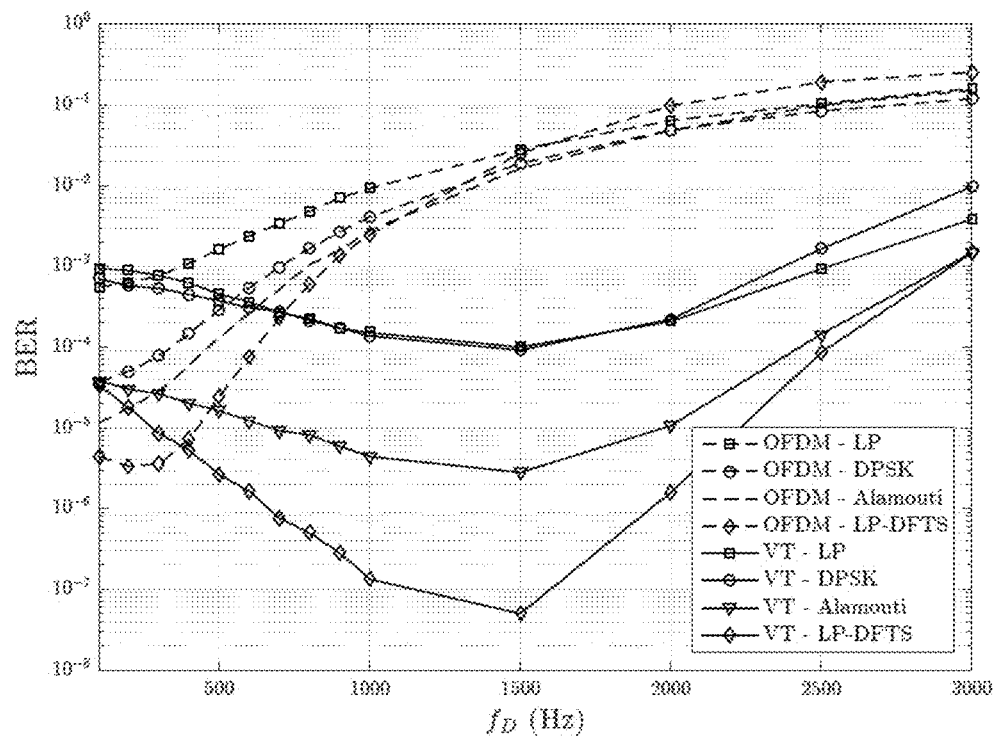
FIG. 1 shows the comparison between the performance of the invention proposed here in its different variants against the classical communication schemes of multiple antennas.

In order to show the gains obtained with this apparatus, FIG. 1 is included with the comparison between the performance of the invention proposed herein in its different variants against the classical communication schemes of multiple antennas. The curves labeled with "VT" refer to the performance of the proposed invention while those labeled with "OFDM" show the different inventions contained in the state of the art. The evaluation metric is the bit error rate (BER) while the evaluation parameter is the Doppler frequency, which is directly proportional to the movement speed of the transceivers. It can be clearly seen that for Doppler frequencies associated with medium and high movement speeds (greater than 300 Hz) all the variants of the proposed invention show a much better performance, obtaining much lower bit rates erroneous.

The communication system of the invention proposed here has the following advantages:
1. It is compatible with current communication technologies, in particular MIMO OFDM systems. This feature implies that this invention can be incorporated with relative ease to devices that are already operating in current standards, which considerably extends the range of application and impact of the invention. In particular, the transmitter requires changes only in the carrier assignment stage, while in the receiver it is necessary to incorporate the virtual trajectory estimation stage. The direct conversion of temporal variability to Doppler diversity in the form of virtual antennas is not found in any known prior invention. This feature facilitates the exploitation of available diversity in the receiver without requiring iterative or complex calculations. In addition, it significantly increases the signal-to-noise/interference ratio (SNIR) so that the ability to operate over greater distances and/or with a lower probability of erroneous bits is obtained, thus increasing the quality of the link. The estimation of the channel is done in the virtual domain in a very simple way, as it is done in the MIMO OFDM systems in the presence of time-invariant channels.
2. The equalization of the data runs in the virtual domain as it were done in the MIMO OFDM systems in the presence of time-invariant channels, this is one of the most important features not found in other inventions.
3. The incoherent detection proposed in this system is much simpler than that found in inventions U.S. Pat. Nos. 9,088,447 and 9,264,118. This form of detection is only possible in the invention object of this document thanks to the preprocessing technique of virtual trajectories detection.

The descriptions of the methods and the process diagrams presented in this invention are provided simply as illustrative examples and are not necessarily intended to require or imply that the steps of the various definitions must be performed in the order presented. As can be appreciated by an skilled person in the art, the steps of the various definitions above can be performed in any order. Words such as "then," "next," etc., are not intended to limit the order of the steps; These words are simply used to guide the reader through the description of the methods. The various illustrative logical blocks, modules, circuits and algorithm stages described in connection with the definitions described herein can be implemented as electronic hardware, computer software, or combinations of both. To clearly illustrate this interchangeability of hardware and software, various illustrative components, blocks, modules, circuits and stages have been described above generally in terms of their functionality. Whether such functionality is implemented as hardware or software depends on the limitations of the application and/or the particular design imposed by a system in general. Experts can implement the described functionality in various ways for each particular application, but such implementation decisions should not be taken as causing a differentiation from the scope of the present invention.

The above description of the disclosed definitions is provided to allow any person skilled in the art to make or use the present invention. Various modifications to these definitions and/or implementations will be readily apparent to those skilled in the art, and the generic principles defined herein may be applied to other embodiments without differing from the spirit or scope of the invention. Thus, the present invention is not intended to be limited to the embodiments shown herein, but should be granted the broadest scope consistent with the following claims and the novel principles and features described herein.

We claim:
1. A communication system of Multiple Inputs and Multiple Outputs ("MIMO") for doubly selective channels with reception of virtual trajectories comprising:
   a. a variant that implements pilot transmission and consistent reception through:

(i) a transmitter structure where the data is entered into a space frequency encoder with space frequency block coding "(SFBC)" coding by annexing pilot subcarriers so that the receiver can perform coherent data detection, to achieve the above, wherein:
  (1) an assignment of the symbols to the carriers of each virtual antenna is carried out,
  (2) each branch is modulated in a conventional orthogonal frequency multiplexing (OFDM) scheme,
  (3) next transmission modes are converted to antennas,
  (3) Doppler virtual trajectories are estimated to obtain diagonalized models free of interference so that the virtual path coefficients are obtained using equations:

$$\hat{\partial}_b = \Psi^\dagger Y_b = \sum_{a=0}^{M_T-1} \Psi^\dagger \Psi \Omega_{a,b} \beta_a + \Psi^\dagger w_b \approx \sum_{a=0}^{M_T-1} \Omega_{a,b} \beta_a + \vec{w}_b \text{ where}$$

$$\Psi^\dagger = (\Psi^H \Psi)^{-1} \Psi.$$

(4) an estimation of virtual trajectories is made using a matrix that is inverted out of execution, said estimation process is carried out at a design stage and an inverse matrix is saved in a receiver, so that said receiver only requires execution of a matrix-vector product to obtain estimates of virtual coefficients of interference-free data, and
  (5) for consistent estimation of low complexity data, a suboptimal detector is used, so that the observation equation for the b-th reception mode and the q-th Doppler trajectory is found as $$\hat{\partial}_{b,q} = \sum_{a=0}^{M_T-1} D(\Gamma \alpha_{a,b,q}) \beta_a + \vec{w}_{b,q}$$

(6) wherein in said previous step a diagonalized data observation model is obtained, which is equivalent to a conventional MIMO-OFDM system in the presence of non-time-varying channels, and therefore Doppler diversity is manipulated as if were additional receiving antennas, thus obtaining an equivalent MIMO model with $M_D \times M_R$ virtual antennas receivers, and
ii A receiver structure, where after the stages of analog/digital coupling to the propagation medium, a signal received on each antenna of said receiver is projected in reception modes for conversion of physical antennas into virtual antennas, wherein said step requires each output signals of said receiver to be treated independently by each reception mode in each of virtual trajectory separators that operate based on the equations:

$$\Psi^\dagger F^H F Y_b = \Lambda u_b \quad \text{iii.}$$

where $$\Lambda \equiv \Psi^\dagger F^H$$
$$u_b \equiv F Y_b \, y$$

-continued $$[F]_{n,n'} = \frac{1}{\sqrt{R}} e^{(-j2\pi n'n/N)}, n, n' = [0, \ldots, N-1]$$

and (1) the case of a system with coherent detection, the result of said virtual trajectory estimator is used by a channel estimation algorithm that operates based on the equation:

$$\hat{\partial}_{a,b,q} = \Theta^\dagger \hat{v}_{b,q}^P = (\Theta^H \Theta)^{-1} \Theta^H \hat{v}_{b,q}^P$$

which in turn passes virtual trajectory coefficients along with estimated channel parameters to a SFBC decoder, and wherein temporary space decoder (SFBC for the coherent case) delivers estimated data, and
b. a variant that uses differential coding and incoherent reception by:
  i. a transmitter structure where data is introduced to a space frequency encoder by means of differential DSFBC encoding so that a receiver uses incoherent detection of the data, and to achieve the above the following steps are implemented
    (1) an assignment of symbols to carriers of each virtual antenna is carried out,
    (2) each branch is modulated in a conventional orthogonal frequency multiplexing (OFDM) scheme and subsequently, the transmission modes are converted to antennas,
    (3) Doppler virtual paths are estimated to obtain diagonalized models free of interference so that virtual trajectory coefficients are obtained as:

$$\hat{\partial}_b = \Psi^\dagger Y_b = \sum_{a=0}^{M_T-1} \Psi^\dagger \Psi \Omega_{a,b} \beta_a + \Psi^\dagger w_b \approx \sum_{a=0}^{M_T-1} \Omega_{a,b} \beta_a + \vec{w}_b \text{ where}$$

$$\Psi^\dagger = (\Psi^H \Psi)^{-1} \Psi.$$

(4) virtual paths are estimated using a matrix that is inverted out of execution, wherein a receiver only requires execution of a matrix-vector product to obtain estimates of virtual coefficients of the interference-free data, and
    (5) using the model $$\hat{\partial}_{b,q} = \sum_{a=0}^{M_T-1} D(\beta_a) \Gamma \alpha_{a,b,q} + \vec{w}_{b,q}$$

and assuming that from the total amount of subcarriers $\{\beta_{a,i} | i \in 0, \ldots, N_T-1, a \in 0, \ldots, M_T-1\}$, a un subset $\{\beta_{a,i}^P | p \in P\}$ have pilots, provides an input/output ratio in a MIMO system is equivalent to a MIMO-OFDM system in invariant systems with the additional advantage of incorporating temporal variability in the form of virtual receiving antennas, wherein, inconsistent reception techniques based on differential space-frequency coding (DSFBC) can be transparently incorporated into this system, and a receiver structure where after stages of analog/digital coupling to propagation medium, the signal received on each antenna is projected in reception modes for conversion of physical antennas into virtual antennas, according to the following steps:

each output signals of this module is treated independently by each reception mode in each of the virtual trajectory separators that operate based on the equations $$\Psi^{\dagger}F^{H}FY_{b}=\Lambda u_{b}$$

where $$\Lambda \equiv \Psi^{\dagger}F^{H}$$

$$u_{b} \equiv FY_{b}\ y$$

$$[F]_{n,n'} = \frac{1}{\sqrt{R}}e^{(-j2\pi n'n/N)}, n, n' = [0, \ldots, N-1]$$

and, wherein there is a variant with incoherent reception, virtual path coefficients are transferred directly to the DSFBC differential decoder and wherein temporary space decoder (DSFBC for incoherent cases) delivers estimated data.

2. The Multiple Inputs and Multiple Outputs ("MIMO") communications system for doubly selective channels with virtual trajectories reception according to claim 1 wherein said system is compatible with MIMO OFDM systems wherein said transmitter requires changes only in a carrier assignment stage, and said receiver it is required to incorporate the estimation stage of virtual paths.

3. A method for calculating parameters and matrices in a transmitter and receiver system for a Multiple Inputs and Multiple Outputs communication system for doubly selective channels with virtual trajectory reception comprising:

a first step of calculating of parameters and matrices in said transmitter and receiver system offline at a predetermined time wherein said calculation step is not performed when said system is trasmitting or receiving signals, and said calculation comprises;

(1) calculation of system parameters,
(2) calculation of channel expansion functions that are necessary according to the equation:

$$h[v, \rho; n, l] = \sum_{a=0}^{M_T}\sum_{b=0}^{M_R}\sum_{r=0}^{M_T-1}\sum_{q=0}^{M_D-1} \alpha_{a,b,r,q}\phi_a^{IV}[v]\phi_b^{III}[\rho]\phi_r^{II}[l]\phi_q^{I}[n] + \varepsilon[v, \rho, n, l],$$

where $\phi_a^{IV}[v], \phi_b^{III}[\rho], \phi_r^{II}[l], \phi_q^{I}[n]$ and $\alpha_{a,b,r,q}$ are functions that expand the domain of receiving antennas, receiving antennas, the delay time and the time respectively, each with the coefficient $\alpha_{a,b,r,q}$, and wherein (III) information of parameters of maximum dispersion in time and frequency, correlation of the channel or in its absence maximum dispersions of arrival angles, as well as block size and bandwidth of the system are used, in said second calculation step, and (i) expansion functions are used to calculate the quantity and distribution of carriers that the transmitter using the equation:

$$k_i = iM_D - N/2$$

, and (ii) results of the previous said calculations are used to further calculate a virtual trajectory separation matrix A in a transmission modes using a truncated version of the matrix defined in the equation:

$$\Psi^{\dagger}F^{H}FY_{b}=\Lambda u_{b}$$

where $$\Lambda \equiv \Psi^{\dagger}F^{H}$$

$$u_{b} \equiv FY_{b}\ \text{and}$$

$$[F]_{n,n'} = \frac{1}{\sqrt{R}}e^{(-j2\pi n'n/N)}, n, n' = [0, \ldots, N-1]$$

it is verified if the system has coherent detection, if it is not, a calculation of parameters is completed since the calculation of additional system parameters is not required, and for coherent detection a calculation of a channel estimation matrix is performed $\Theta^{\dagger}$, by using information on the position of the pilot carriers as well as their respective values in the equations $$\hat{\theta}_{b,q}=\Phi^{\dagger}\hat{v}_{b,q}^{P}=(\Phi^{H}\Phi)^{-1}\Phi^{H}\hat{v}_{b,q}^{P}$$

$$\hat{v}_{b,q}^{P}=D(\beta_a^{P})\Gamma^{P}\alpha_{a,b,q}+\tilde{W}_{b,q}^{P}=\Theta\alpha_{a,b,q}+\tilde{W}_{b,q}^{P}$$

where $\Theta \square D(\beta_a^{P})\Gamma^{P}$, parameters of base expansion of the channel is then calculated separately for each of the transmission modes, using the least squares criterion.

* * * * *